UNITED STATES PATENT OFFICE.

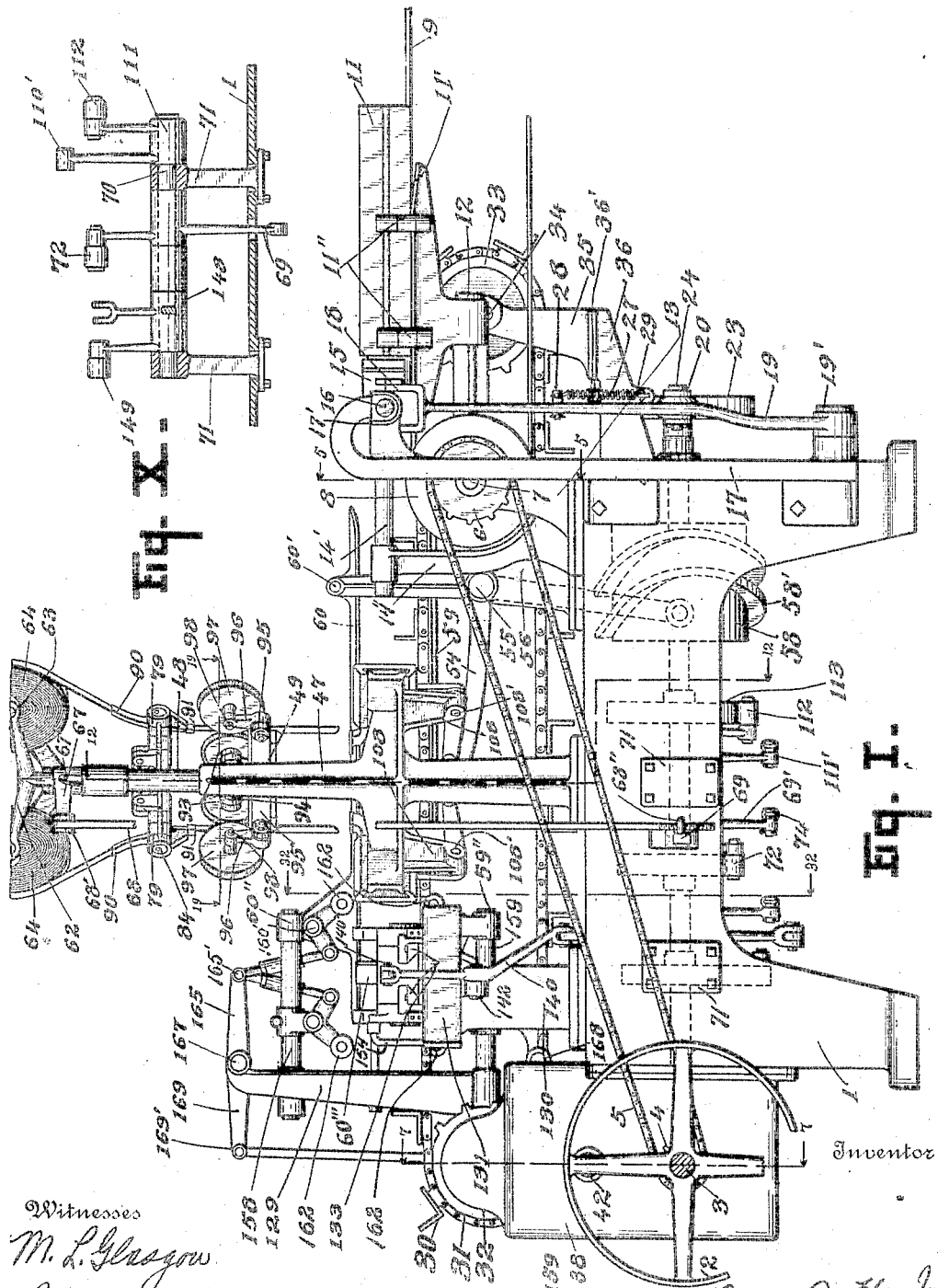

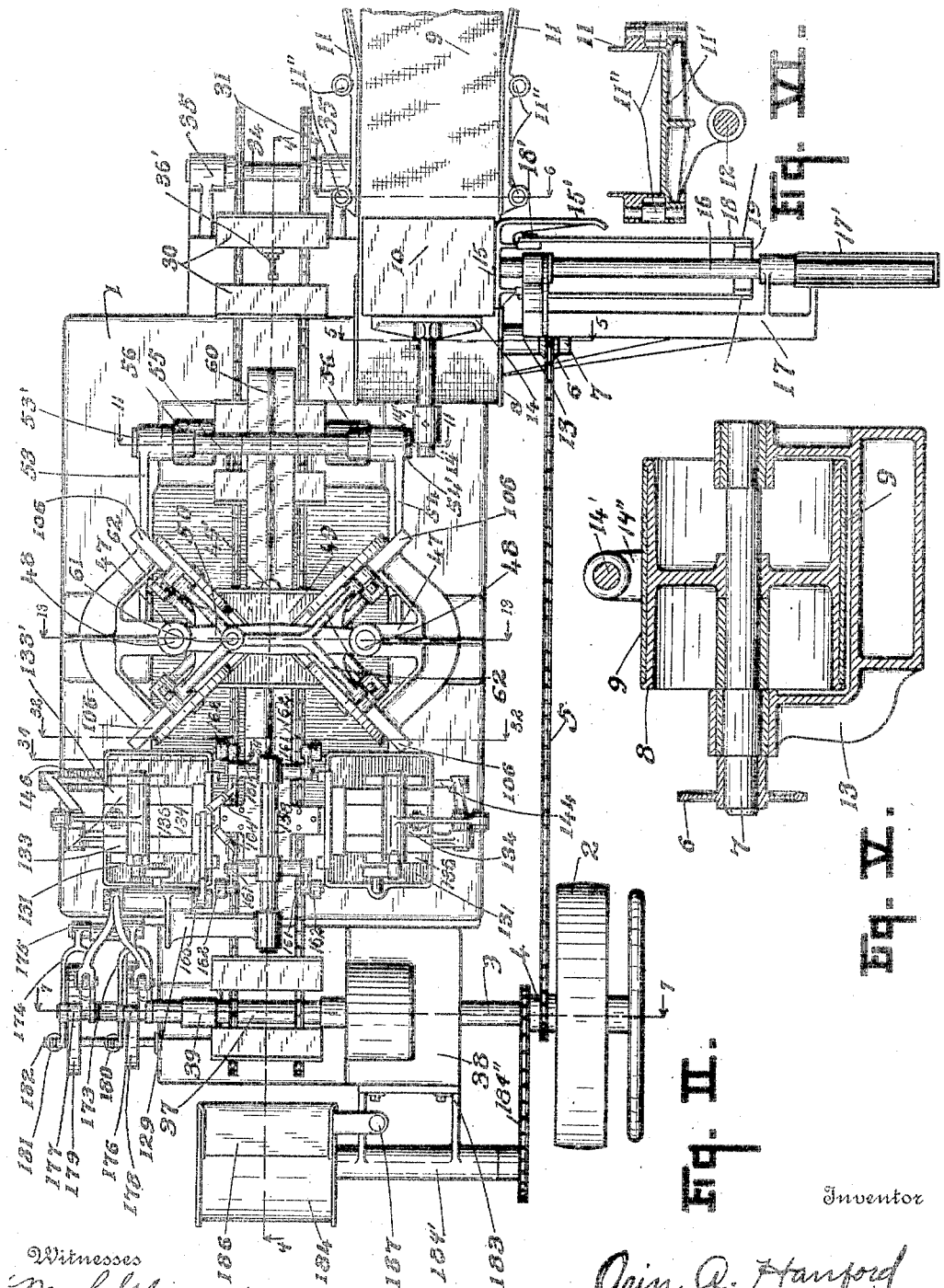

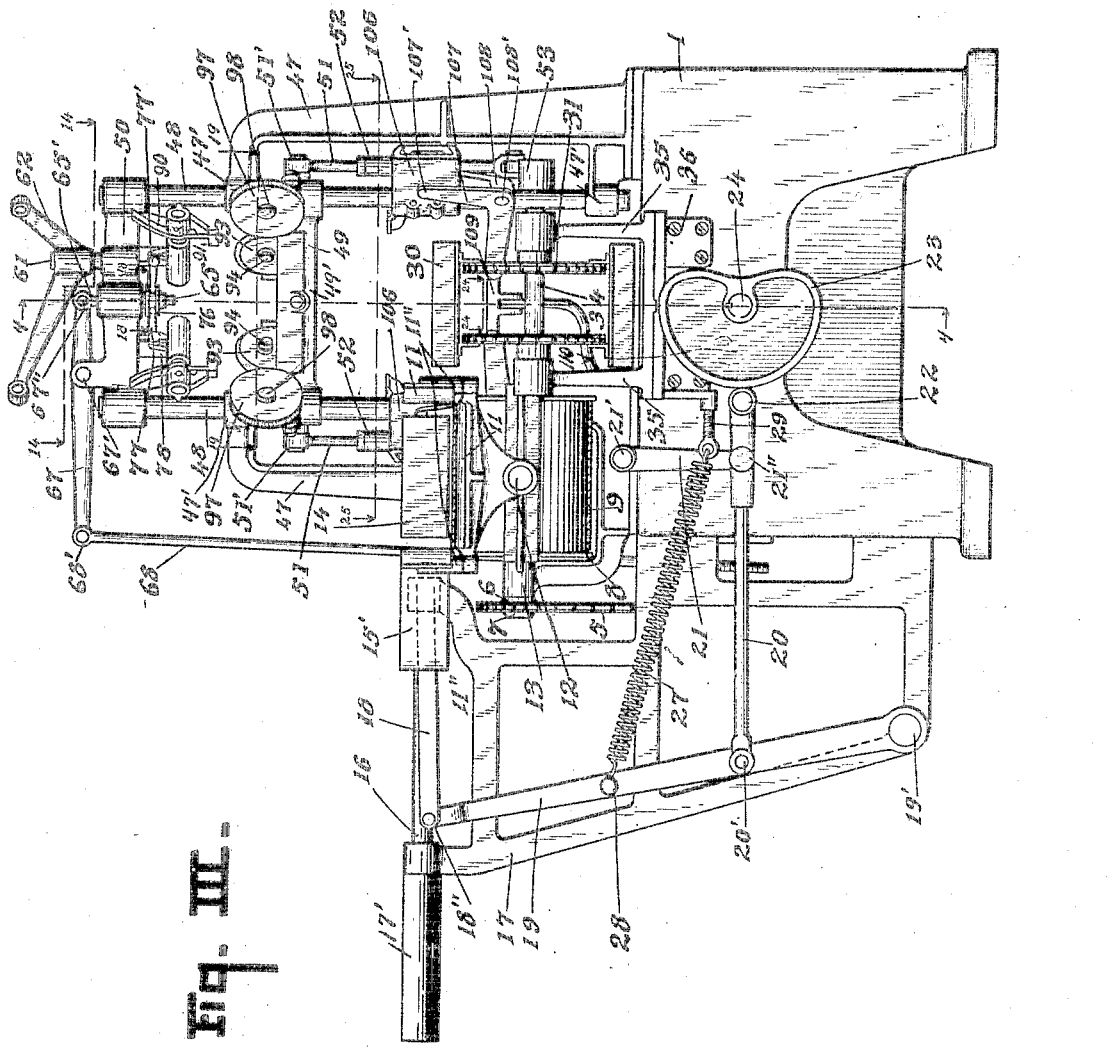

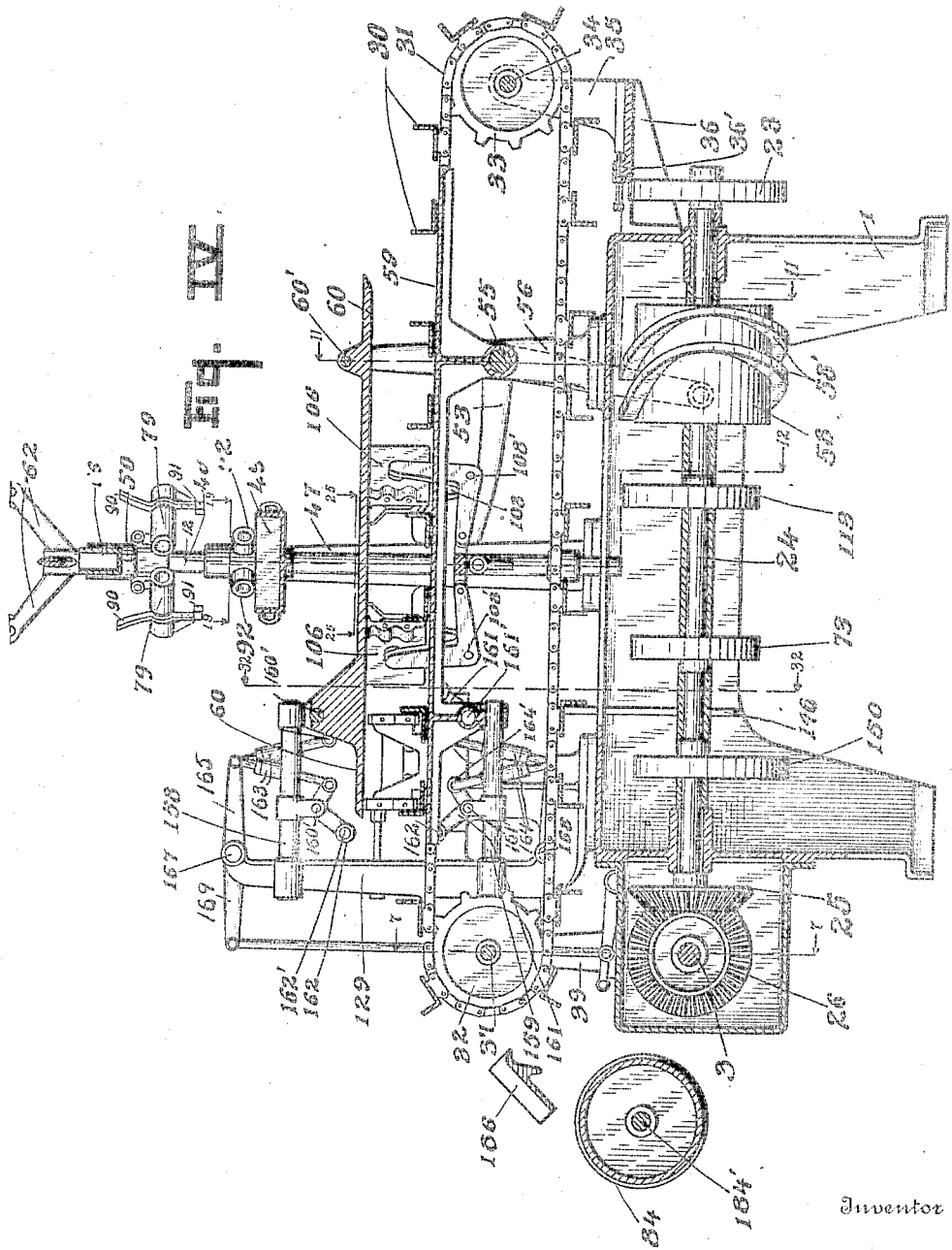

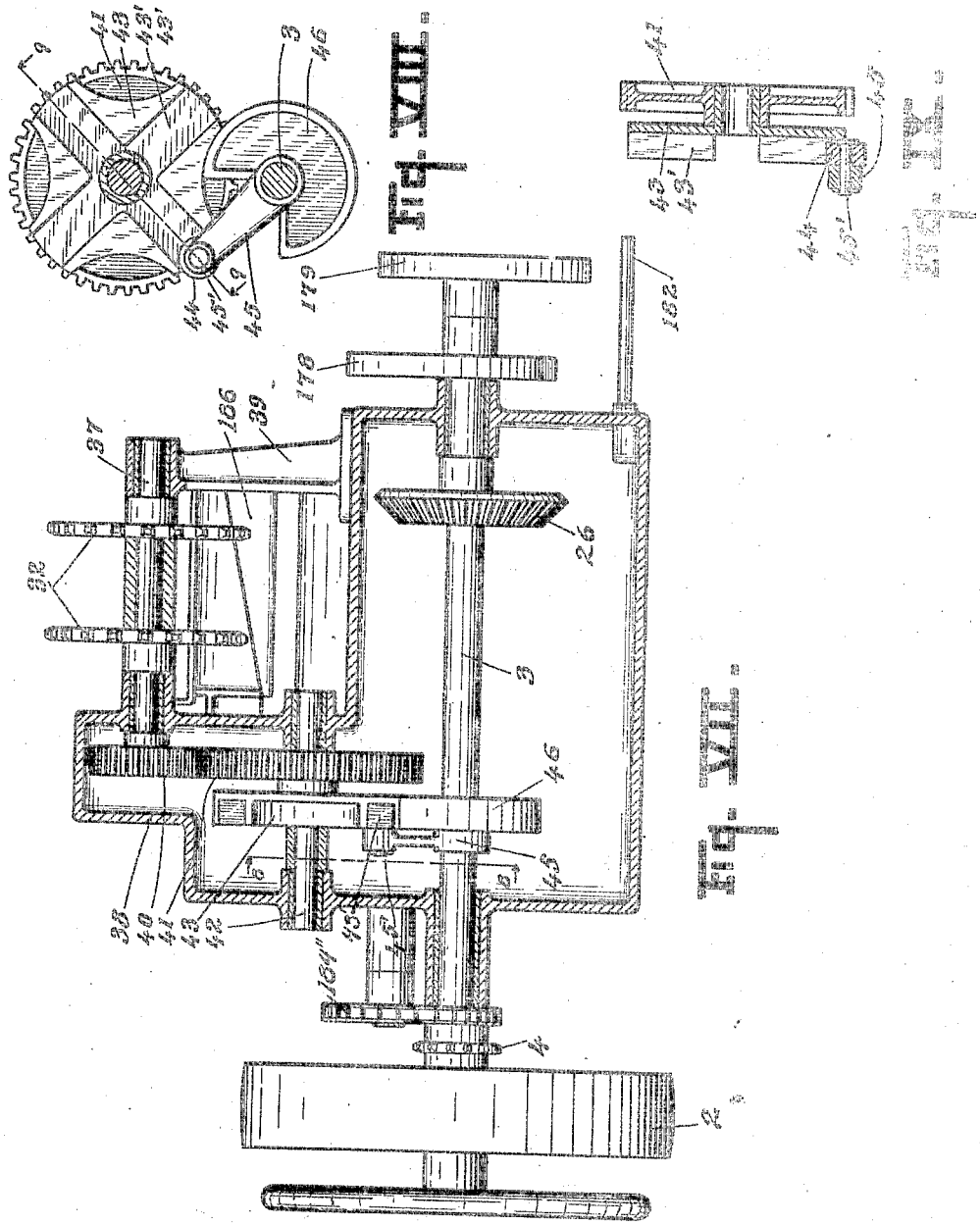

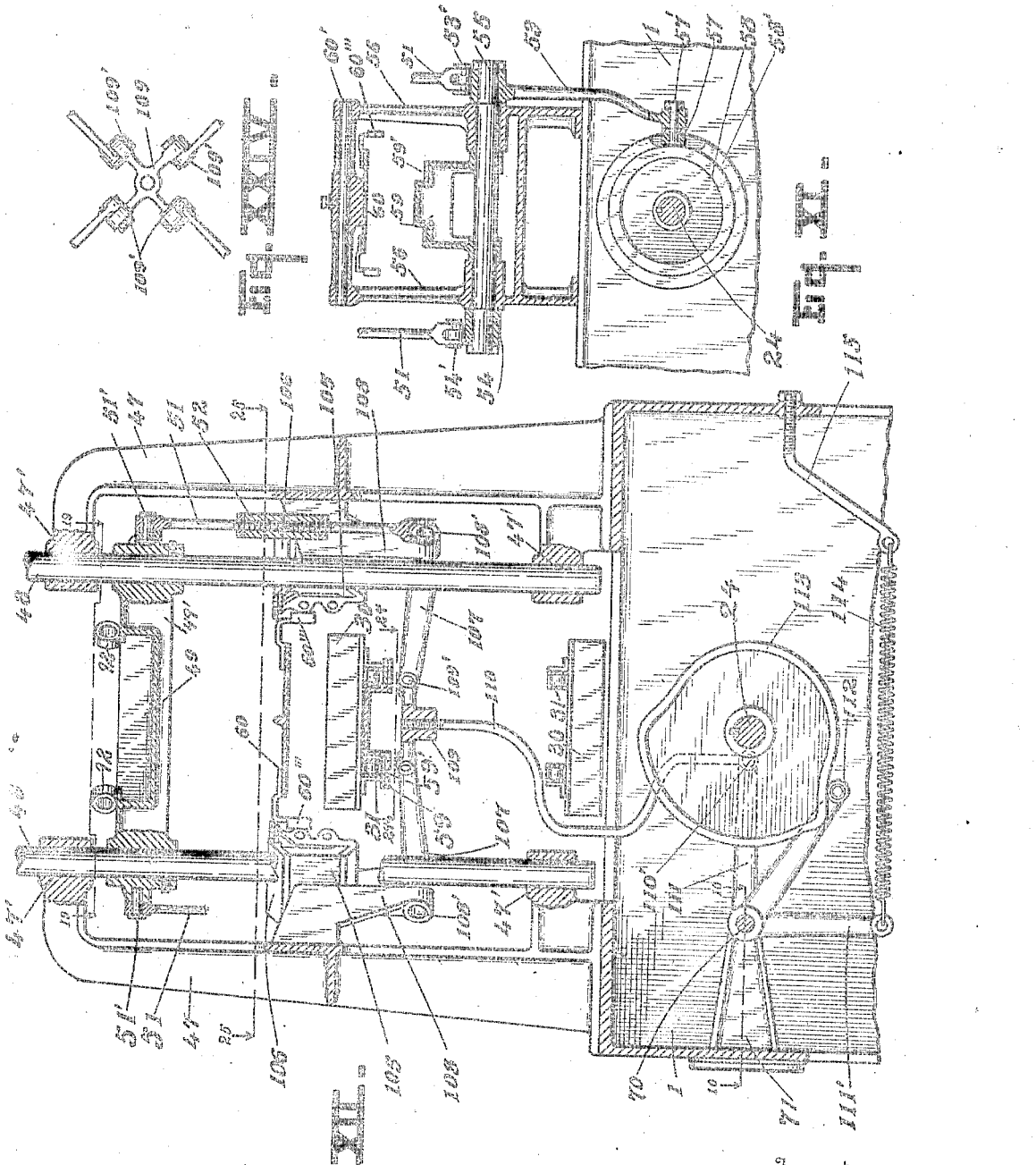

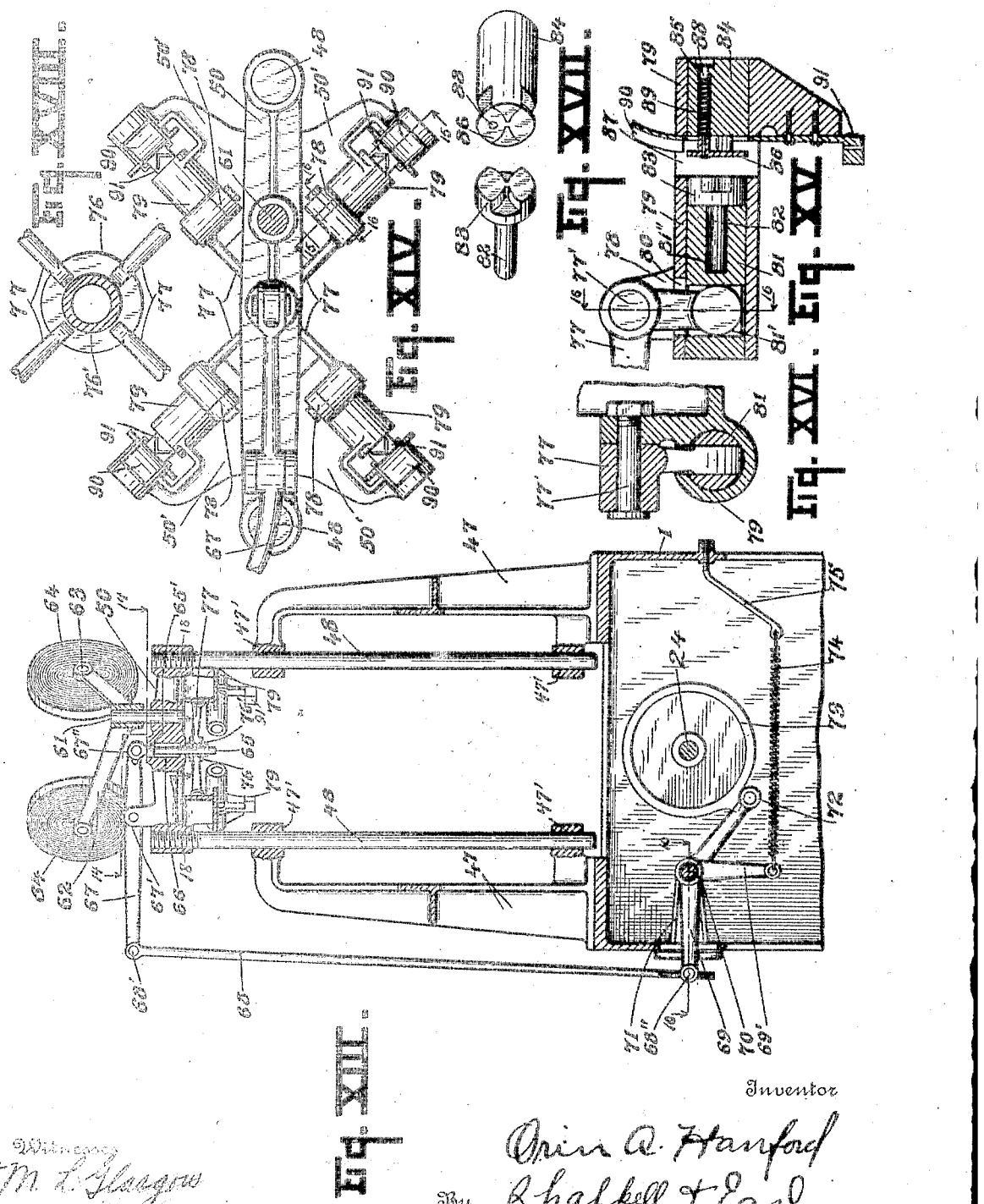

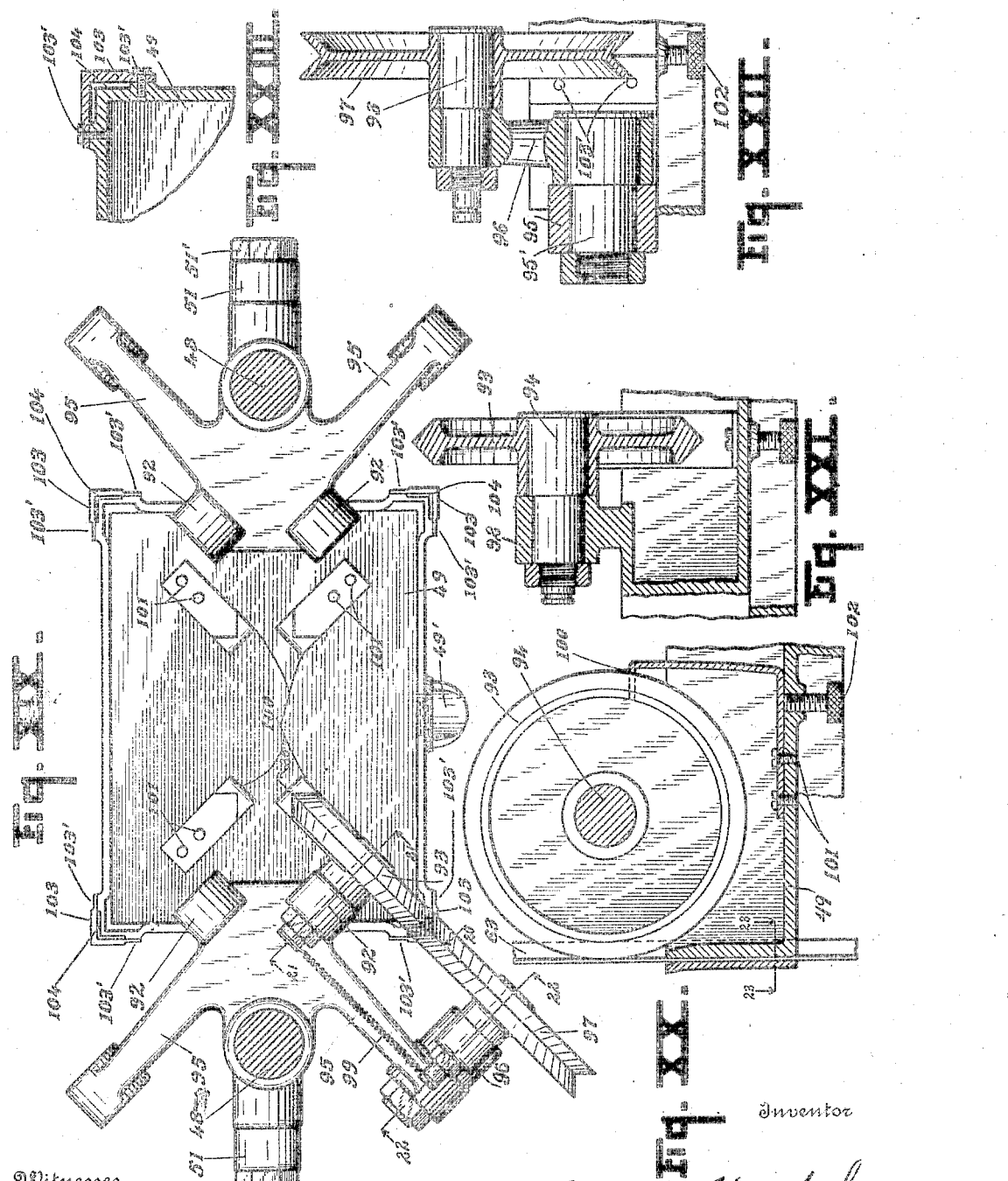

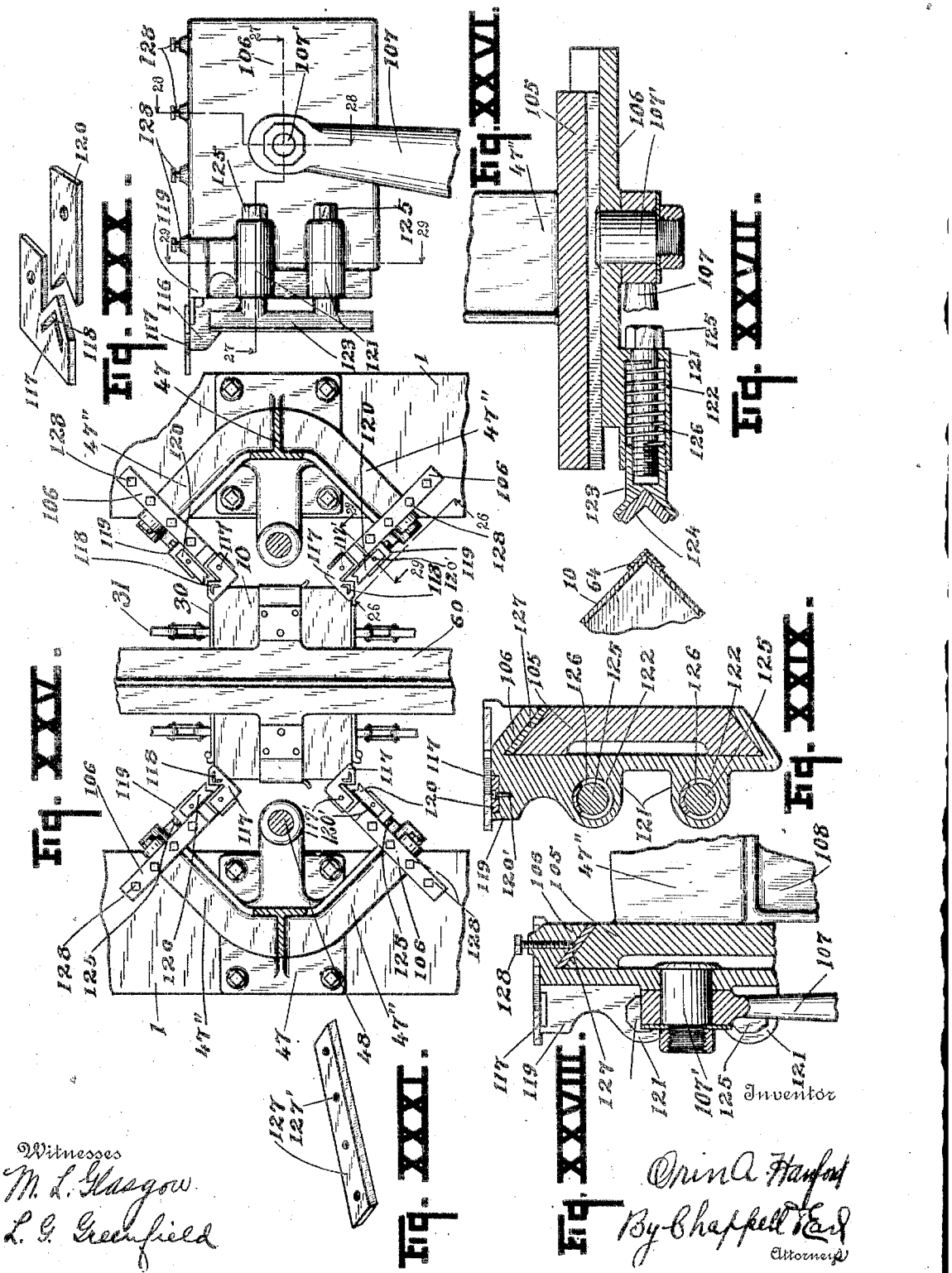

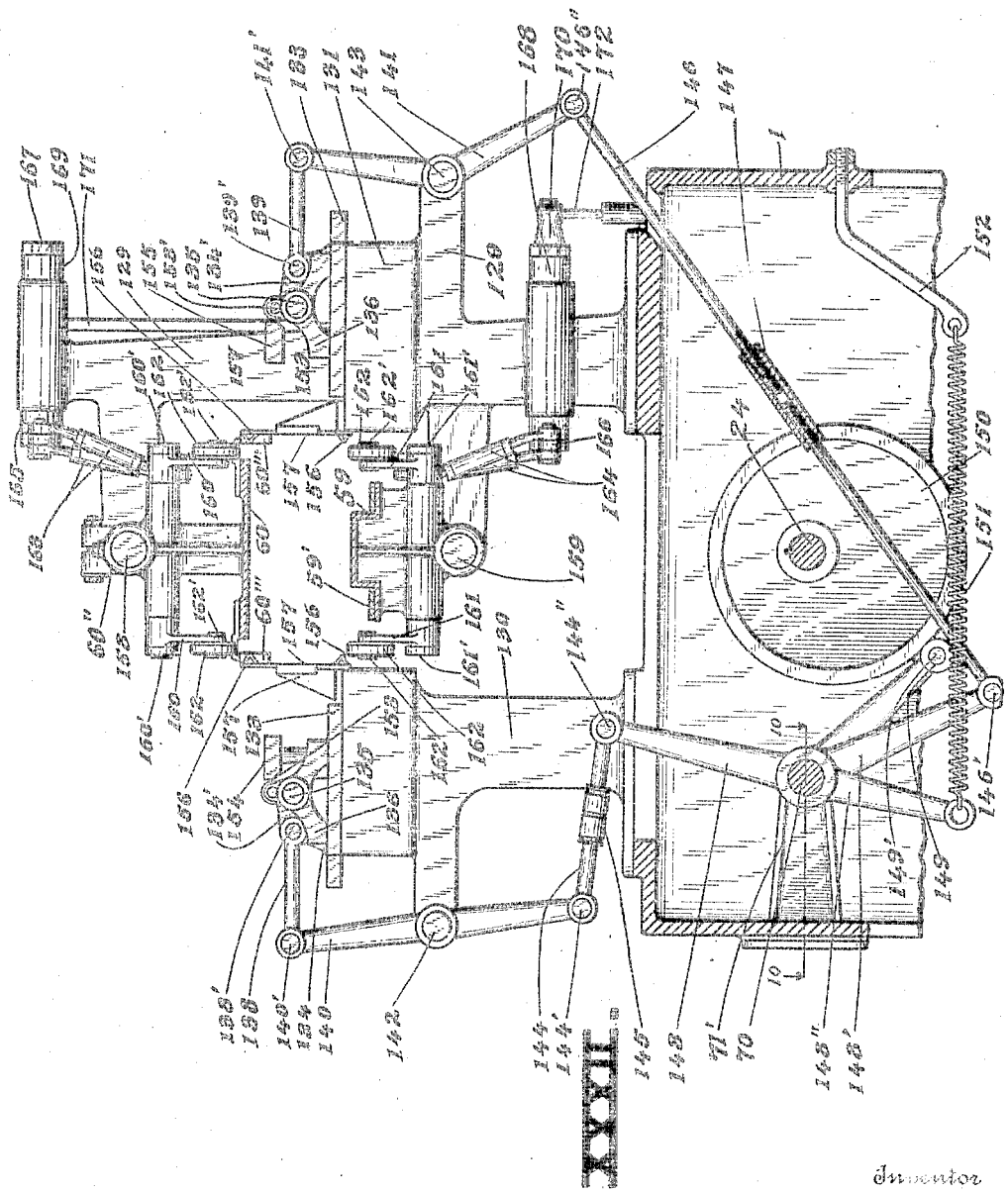

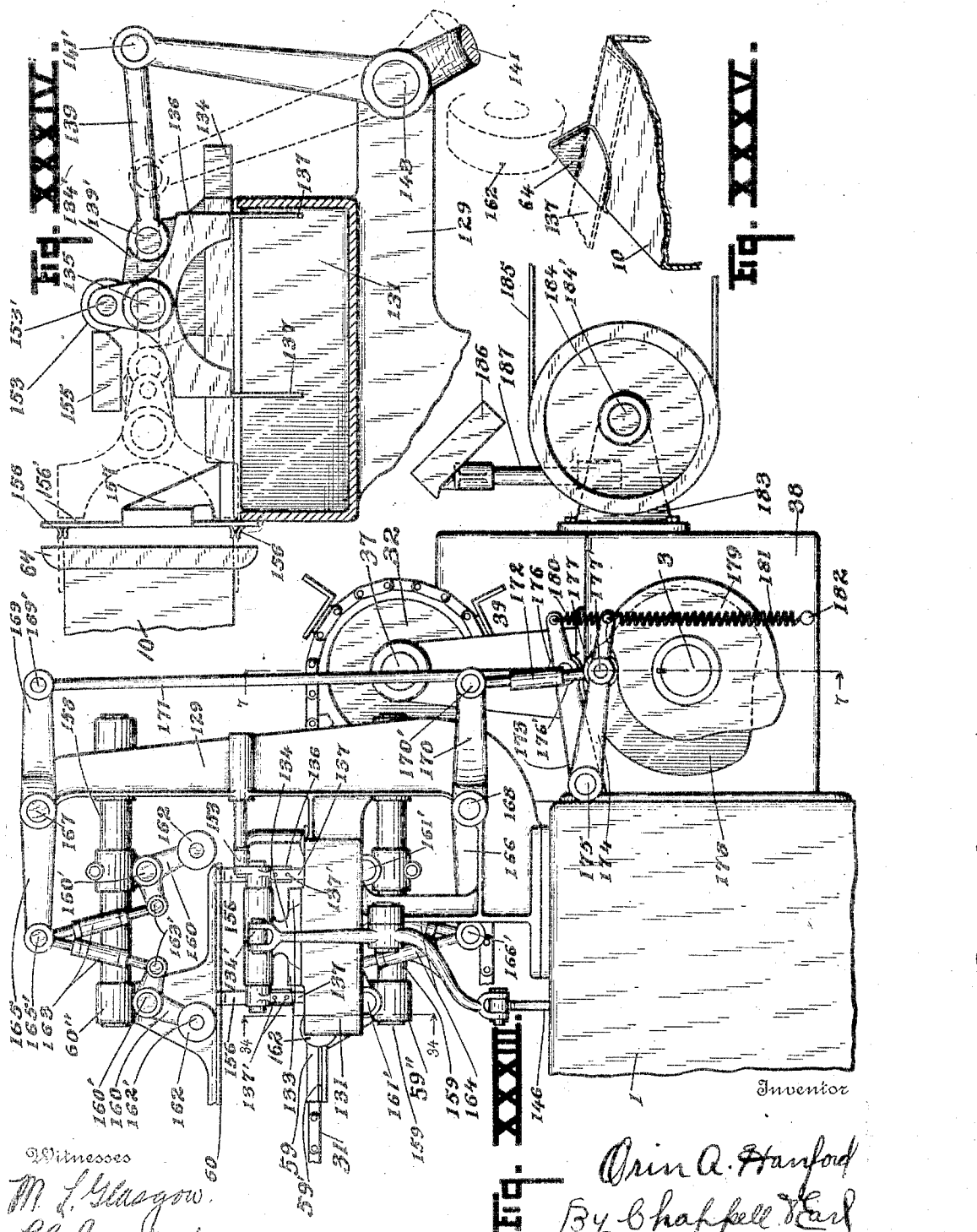

ORIN A. HANFORD, OF ROCHESTER, NEW YORK, ASSIGNOR TO JOHN L. KELLOGG, OF BATTLE CREEK, MICHIGAN.

SEALING-MACHINE.

1,116,696.

Specification of Letters Patent.   Patented Nov. 10, 1914.

Application filed October 22, 1912.   Serial No. 727,101.

*To all whom it may concern:*

Be it known that I, ORIN A. HANFORD, a citizen of the United States, residing at Rochester, county of Monroe, State of New York, have invented certain new and useful Improvements in Sealing-Machines, of which the following is a specification.

This invention relates to a machine for applying sealing strips to the corners of boxes or cartons.

The machine is especially designed for applying sealing strips to the corners of boxes or cartons such as are commonly used in marketing prepared cereal foods, although it may be readily adapted for various types of boxes or cartons.

The main objects of this invention are:— First, to provide a machine adapted to automatically and economically apply corner sealing strips to boxes or cartons. Second, to provide in a machine of the class described, means for conveying the cartons or boxes through the machine. Third, to provide in a machine of the class described, means for forming the sealing strips from rolls of tape or paper ribbon. Fourth, to provide in a machine of the class described, means for applying glue or other suitable adhesive to the sealing strips. Fifth, to provide in a machine of the character described, means for affixing the sealing strips to the corners of the boxes or packages. Sixth, to provide in a machine of the character described, means for folding, applying adhesive to and sealing the ends of the strips over the corners of the boxes or cartons.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a side elevation of a structure embodying the features of my invention, portions of the rolls of the sealing tape or ribbon and their supports and of the feed belt being broken away. Fig. II is a plan view a portion of the feed belt being broken away, the delivery conveyer belt being omitted. Fig. III is a front elevation. Fig. IV is a vertical longitudinal section on a line corresponding to line 4—4 of Figs. II and III, the tape rolls, guides, and glue applying wheels and parts of the operating mechanism being omitted. Fig. V (see Sheet 2) is a detail transverse vertical section of the feed conveyer on a line corresponding to line 5—5 of Figs. I and II. Fig. VI (see Sheet 2) is a detail vertical section through the feed conveyer on a line corresponding to line 6—6 of Fig. II. Fig. VII is a detail vertical transverse section on a line corresponding to line 7—7 of Figs. I, II, IV and XXXIII, showing details of the driving gear. Fig. VIII is a detail vertical section on a line corresponding to line 8—8 of Fig. VII. Fig. IX is a detail section on a line corresponding to line 9—9 of Fig. VIII. Fig. X (see Sheet 1) is a detail horizontal section on a line corresponding to line 10—10 of Figs. XII, XIII and XXXII, showing details of the operating mechanism. Fig. XI is a detail transverse vertical section on a line corresponding to line 11—11 of Figs. II and IV, showing details of the conveyer way and parts of the actuating mechanism. Fig. XII is a detail transverse vertical section on a line corresponding to broken line 12—12 of Figs. I and IV showing details of the sealing strip feeding, gluing and cutting mechanism. Fig. XIII is a detail transverse vertical section taken on a line corresponding to line 13—13 of Fig. II, showing details of the tape or strip rolls, cutters, sealing tape and feed mechanism. Fig. XIV is a detail plan view showing the sealing strip cutters and a portion of the operating mechanism therefor sectioned on a line corresponding to line 14—14 of Figs. III and XIII. Fig. XV is a detail vertical section through one of the sealing strip cutters on a line corresponding to line 15—15 of Fig. XIV. Fig. XVI is a detail section on a line corresponding to line 16—16 of Fig. XV. Fig. XVII is a perspective view of the punch 83 and die 84. Fig. XVIII is a detail horizontal section on a line corresponding to line 18—18 of Figs. III and XIII showing details of the cutter operating mechanism. Fig. XIX is a detail view partially sectioned on a line corresponding to line 19—19 of Figs. I, III, IV and XII, showing the arrangement of the silicate or glue tank, the tape guides and the glue applying wheels. Fig. XX is a detail vertical section on a line corresponding to line 20—20 of Fig. XIX. Fig. XXI is a detail vertical section on a line corresponding to line 21—21 of Fig. XIX. Fig. XXII is a detail vertical section on a line corresponding to line 22—22 of Fig. XIX. Fig. XXIII is a detail horizontal section on a line corresponding to line 23—23 of Fig. XX. Fig. XXIV (see Sheet 6) is a detail horizontal view on a line corresponding to line 24—24 of Figs. III and XII. Fig. XXV is a detail horizontal section on a line corresponding to line 25—25 of Figs. III, IV and XII, showing details of the sealing strip affixing and severing mechanism. Fig. XXVI is a detail side view of one of the sealing strip affixing members taken on a line corresponding to line 26—26 of Fig. XXV. Fig. XXVII is a detail horizontal section taken on a line corresponding to the broken line 27—27 of Fig. XXVI. Fig. XXVIII is a detail vertical section on a line corresponding to the broken line 28—28 of Fig. XXVI. Fig. XXIX is a detail vertical section on a line corresponding to line 29—29 of Figs. XXV and XXVI. Fig. XXX is a perspective view of the sealing strip severing knives 117 and 120. Fig. XXXI is a perspective view of the adjustable beaming plate 127. Fig. XXXII is a detail vertical transverse section on a line corresponding to line 32—32 of Figs. I, II and IV, showing details of the sealing strip gluing and sealing and folding mechanism. Fig. XXXIII is a detail side elevation of the rear part of the machine looking from the right of Fig. XXXII. Fig. XXXIV is a detail section taken on a line corresponding to line 34—34 of Figs. II and XXXIII, showing further details of the sealing strips, gluing, folding and sealing mechanism. Fig. XXXV is a detail perspective view of a carton showing the manner of folding the sealing strip, one of the guide applying and folding fingers and one of the folding rollers being indicated by dotted lines.

In the drawings, similar reference characters refer to similar parts throughout the several views, and the sectional views are taken looking in the direction of the little arrows at the ends of the section lines.

The means employed to accomplish the objects of this invention consist in general, of the combination with a carton feeding means, of a sealing conveyer or carrier for carrying the cartons through the machine with a step by step movement; means for forming the sealing strips from rolls of tape or ribbon-like strips of paper; means for applying adhesive to the sealing strips; means for applying the sealing strips to the boxes or cartons; means for applying adhesive to the ends of the sealing strips and folding and sealing the same; and means for delivering or discharging the boxes or cartons, the several mechanisms and operations all being provided with suitable driving or actuating means whereby their operations are properly timed.

The embodiment of the invention illustrated in the accompanying drawing to which reference is made, will now be described.

The frame 1 is designed as a main support or base for the various parts and mechanisms. The several mechanisms are driven through the pulley 2 on the shaft 3 disposed at the rear end of the machine.

The cartons or boxes are delivered to the machine by the feed belt 9, the rear end of which is supported by the pulley 8 on the shaft 7. See Figs. I, II and V.

The shaft 7 is provided with a sprocket 6 which is connected to a sprocket 4 on the shaft 3 by means of the chain 5. A carton 10 is shown on the feed belt,—see Fig. II— the carton being shown resting against the stop 14 in position for the shifter 15 to act thereon, the mechanism being shown in the drawings in its initial position, or at the beginning of a cycle of its movements.

In order to insure the delivery of the cartons in the proper shifting position, I provide the feed belt 9 with guides 11 at each side. The forward ends of these guides diverge forwardly to form a throat to receive the cartons. See Fig. II.

A table or support 11' is arranged in front of the pulley 8 to support the feed belt at the proper level for the cartons to be shifted therefrom onto the sealing conveyer. The table or support 11'—see Figs. I and III—is supported upon an arm 12 projecting forwardly from the pedestal 13 on which the bearings for the shaft 7 are mounted. The forward end of the table or support 11' is inclined downwardly—see Fig. I—so that its belt 9 and its load of cartons pass easily up in the same. The guides 11 are supported by the shouldered studs 11'' carried by the table 11'—see Figs. II and VI.

The stop or abutment for the cartons 10 is provided with a rod-like supporting arm 14' carried by the upwardly projecting arm 14'' at the rear of the pulley 8. The carton shifter 15 is mounted on the reciprocating shaft 16 which is supported in suitable bearings carried by the frame 17, mounted on the side of the base 1. See Figs. I and II. The shifter 15 is connected by the links 18 to the oscillating lever 19 which is mounted on the pivot 19'. See Figs. I and III. The upper end of the lever 19 is forked and the links 18 are connected to the arms of the fork by the pivots 18″.

A trough-like guard 17′ is provided for the outer end of the reciprocating shaft 16. See Figs. I, II and III. The shifter 15 is provided with a guard or stop 15′ which holds back the cartons on the feed belt when the shifter is actuated, the stop moving across the feed belt like a gate when the shifter is actuated.

The lever 19 is oscillated by means of the cam actuated pitman or push rod 20 and spring 27. The rod 20 is pivoted to the lever 19 at 20′ and supported by the link 21, the link being pivotally supported at 21′ and pivotally connected to the pitman at 21″. See Fig. III. The pitman 20 is provided with a roller 22 at its inner end traveling upon the cam 23 which is carried by a shaft 24. Thus connected, the cam acts to retract the shifter, the spring 27 coacting to move the shifter in the opposite direction or on its shifting movement. The spring 27 is connected to the stud 28 on the lever 19 and to an eye bolt, the tension of the spring being adjusted by means of the bolt 29.

The conveyer by which the cartons are carried through the machine and which is herein designated as the sealing conveyer, consists of the carton holders 30 mounted on the sprocket chains 31. These carton holders 30 are angle plates arranged with their angles facing to receive the boxes or cartons therebetween, the cartons being delivered from the feed belt to the holders or carriers by the shifter 15 in which the relation of these parts are clearly shown. The chains 31 are carried by sprockets 32 and 33, the sprockets 32 being the driven sprockets. The sprockets 33 are mounted on a shaft 34 carried by the pedestal 35 at the front end of the machine. The pedestal 35 is mounted for adjustment on a suitable way on the bracket 36, the adjustments being effected by the screw 36′. See Fig. IV. The shaft 37 for the sprockets 32 at the rear of the machine is supported at one end by the gear housing or casing 38 and at the other by the pedestal 39 mounted on the gear housing. See Fig. VII. The shaft 37 is connected by the gears 40 and 41 to a shaft 42.

An intermittent movement is imparted to the shaft 42 and the parts driven therethrough by providing the shaft with a Geneva stop member 43 having radial groove-like ways in its face in which the roller 44 on the arm 45 carried by the shaft 3 travels. The stop member 46 on the shaft 3 co-acts with the stop member 43. See Fig. VIII. The roller 44 is carried by the spindle 45′ on the arm 45. By this driving connection an intermittent or step by step movement is imparted to the sealing conveyer from the continuously driven shaft 3. See Figs. VII, VIII and IX.

The shaft 24 arranged longitudinally of the frame—see Fig. IV—is provided with a beveled gear 25 meshing with the beveled gear 26 on the shaft 3. The cam 23 is mounted on the forward end of the shaft 24. This driving connection times the shifter and the sealing conveyer so that the shifter is actuated while the sealing conveyer is at rest. At the rear of the shifter are uprights or standards 47 having bearings 47′ for the vertically reciprocating rods 48. Mounted upon these rods to reciprocate therewith is a tank 49 for glue, silicate or other suitable adhesive, the tank being carried by the cross member 49′. Mounted upon these rods 48 above this cross member 49′ is a cross head or member 50 on which the rolls of tape and certain mechanism hereinafter described is mounted. The rods 48 are connected by the links 51 to the arms 53 and 54 on the rock shaft 55. See Figs. II, IV and XI. The arm 53 is a bell crank arm and is provided with a roller 57 engaging the cam groove 58′ of the barrel cam 58. See Figs. IV and IX. The roller 57 is mounted on a bearing pin 57′ projecting laterally from the arm 53. The links 51 are connected at their upper ends to the cross member 49′ by the pivots 51′. The links are connected at their lower ends to the arms 53 and 54 by pivots 53′ and 54′ respectively. The links 51 are provided with turn buckles 52. The rock shaft 55 is carried by a standard or pedestal 56 arranged in front of the uprights 47, the rock shaft being dispersed transversely below the conveyer. The conveyer bed or support 59 is mounted on the rock shaft 55 and on the arm 159 toward the rear of the frame. See Figs. IV, IX and XXXII. This conveyer bed supports the carriers while the cartons are being acted upon by the sealing affixing strip and sealing mechanism. The support 59 is stepped in cross section as shown in Fig. XI, and is provided with wear plates 59′ for the sprocket chains 31.

The conveyer is provided with top plate 60 supported above the bed plate 59 by means of the cross rod 60′ at its forward end carried by standards 56 and by the arm 158 at its rear end. These top and base conveyer plates are provided for securely supporting the cartons while the sealing strips or tapes are being affixed and folded and secured thereto. Mounted on the top plate 60 in position to engage the carton while the sealing strips are affixed thereto, is a pair of holders 60‴. These holders support the cartons against endwise movement at this point. See Fig. XII. Mounted on the cross head 50 by means of the vertical stud 61 is an armed support 62 having spindles 63 for the sealing of tape 64. A sealing strip cutter is provided for each tape. These cutters are actuated through the vertically reciprocating member 65 arranged in a bearing 66 in the cross head 50. See Fig. XIII.

The member 65 is provided with an enlargement 65' which is a sliding fit in the bearing 66. The member 65 is reciprocated by the lever 67 pivoted at 67' and connected by the link 68, to one arm of the three armed lever 69 mounted to oscillate on the shaft 70 carried by brackets 71 within the main base 1. The lever 69 is provided with a roller 72 traveling on the cam 73 on the shaft 24. See Fig. XIII. A spring 74 supported by the rod 75 on the base 1 is connected to the arm 69' of the lever 69. The link 68 is connected to the lever 67 by the pivot 68' and has threaded engagement with the pivot 68'' on the lever 69. See Fig. XIII. The lever 67 is pivotally connected to the reciprocating member 65 by the pivot 67'', the lever being slotted to receive the pivot 67'', the connections being clearly shown in Fig. XIII referred to. The reciprocating member 65 is provided with a head 76 slotted to receive the ends of the bell crank levers 77 for actuating the sealing strip cutters. See Figs. XIII and XVIII. The levers 77 are pivoted at 77' on arms 78 of the brackets 50' on the cross head 50. These brackets 50' are provided with supports 79 for the punches 83 and the dies 84. See Figs. XIV, XV, XVI and XVII.

The tapes are guided to the cutters by the guides 90. The punches 83 are carried by the punch blocks 81 slidably arranged in the supports 79, the supports being slotted at 80 to receive the ends of the bent levers 77 which engage slots in the blocks 81, the ends of the levers being rounded at 81' as shown in Fig. XV. The punch blocks 81 are provided with longitudinal sockets 81'' for the stems 82 of the punches 83. See Fig. XV.

The dies 84 are supported oppositely of the punches and are provided with clearers 86 carried by the rods 88 pressed by the spring 89 in recesses 85 in the dies 84. These cutters do not entirely sever the sealing strips from the tape, but cut opposed notches in their edges, the strips being connected to the tape by a narrow central part sufficient to support the sealing strips and to effect the feeding of the tape as will appear as the description proceeds.

At the lower ends of the guides 90, and below the punches are guides 91 having V-shaped slots or eyes therein through which the sealing strips pass. See Figs. XIV and XV. These guides 91 guide the sealing strips to the glue rolls 93 mounted on spindles 94 carried by the ears 92 on the cross member 49' by which the glue receptacle 49 is carried, the glue rolls being supported to revolve in the receptacle. These glue rolls have A-shaped peripheries, while the coacting strip supporting rolls 97 have V-shaped peripheries, so that the sealing strips are conformed as they are passed through the guides 91 and between the glue rolls 93 and the strip supporting rolls 97.

The glue rolls are arranged diagonally of the glue receptacle and at each corner of the receptacle is a guide 103 forming an angle guide or eye 104 through which the sealing strips pass. The guide plates 103 are secured to the glue receptacle by screws 103'. See Fig. XXIII. The sealing strip supporting rolls 97 are carried by the spindles 98 which are mounted on arms 96 pivoted on studs 95' on the arms 95 of the cross member 49'. Coiled springs 99 connect the projecting ends of the spindles 94 and 98 to yieldingly support the supporting rollers. See Figs. XIX, XXI and XXII.

Scrapers 100 are provided for the glue rolls, these scrapers being in the form of springs having V-shaped notches in their free ends coacting with the glue rolls, the springs being offset at their lower ends and attached to the bottom of the glue receptacle by the screws 101. Adjusting screws 102 are arranged through the bottom of the receptacle to engage these scrapers for adjusting the same to and from the glue wheels. See Fig. XX.

From the glue wheels and guides 104, the glued and conformed sealing strips drop down at the corners of the boxes or cartons brought to position by the sealing conveyer.

The glued and conformed sealing strips are dropped or fed to a fixing position by the down movement of the cross head while the tapes are fed or unwound by the upward movement of the cross head, the sealing strips being held during this upward movement by the affixing devices.

The sealing strip affixing members 123 are angled in cross section to coact with the corner of the box or carton. See Fig. XXVII and are provided with a yielding facing 124 of felt or rubber.

The affixing members are carried by the carriages 106 reciprocating on ways 105 disposed diagonally of the box or carton when in position to receive the sealing strips. These ways are supported by arms 47'' projecting from the uprights 47. The carriages 106 are actuated by bell crank levers 107 pivotally mounted at 108' on arms or hangers 108 carried by the uprights 47. The levers 107 are connected to the carriages 106 by the pivots 107'. See Figs. IV, XXVI, XXVII and XXVIII. The ways 105 are dovetailed in cross section while the carriages 106 are correspondingly shaped to slide thereon. See Figs. XXVII, XXVIII and XXIX. The ways are provided with gibs or wear plates 127 adjustably retained by the set screws 128 engaging holes 127' in the wear plates. See Fig. XXXI. See Figs. XXVI, XXVIII and XXIX.

The affixing members 123 are slidably supported in the bosses 121 on the carriages 106, the bosses having sockets 122 therein, by means of the springs 126. The supporting stems 125 of the affixing members 123 are threaded as shown in Fig. XXVII and constitute adjusting members.

The bell-crank levers 107 are all connected to the spider-like member 109 by means of the pivots 109'. See Figs. XII and XXIV. This member 109 is arranged centrally below the conveyer bed 59, and is connected by the link 110 to the three-armed actuating lever 111 which is mounted on the shaft 70. One arm of this lever 111 is provided with a roller 112 traveling on the cam 113. A spring 114 is connected to the arm 111' of the lever 111 to actuate the lever in one direction. The spring is carried by the rod 115 on the base 1, see Fig. XII. The cam 113 being on the shaft 24, the actuation of the label affixing members is properly timed.

The reciprocation of the rods 48 is timed so that their upward movement takes place while the sealing strips are clamped by the label affixing members so that on its upward movement the tape is unwound. The actuation of the sealing strips or forming cutters is timed so that it takes place after this feeding or unwinding movement of the tapes and while the tapes are at rest. The adhesive is applied to the sealing strips during this upward movement. The glued and cut sealing strips are fed to position to be engaged by the affixing members on the downstroke or movement.

After the upstroke of the cross head is completed and before the affixing members are retracted, the sealing strips are completely severed by the knives 117 and 120, see Figs. XXV and XXX, which co-act with a shear-like action. The sealing strips drop through the slots 118 in the knives 117, which knives are mounted on the ways 105 by means of the screw 117'. The co-acting knives 120 are mounted by means of the screw 120' on the bosses 119 on the reciprocating carriages 106, the knives being thus supported above the affixing members 123.

The cam 113 is so shaped that the affixing members are given a final compressing movement and this final compressing movement actuates the knives to completely sever the sealing strips. All of these movements referred to take place while the sealing conveyer is at rest. After this final compression of the sealing strip affixers, the affixers are withdrawn and the conveyer is actuated to carry the cartons another step and to position to be acted upon by the mechanism for folding, gluing, and sealing the ends of the sealing strips. This mechanism is detailed in Figs. XXXII to XXXV, inclusive. This mechanism is supported on brackets 129 and 130 oppositely arranged at the sides of the sealing conveyer toward the rear of the machine. On these brackets are glue receptacles 131, on which are mounted ways 133 for the carriages 134 of glue applying and sealing strip folding members 136. These members 136 are each provided with four fingers 137 adapted to apply the glue and fold the ends of the sealing strips, as indicated in dotted lines in Fig. XXXV.

The members 136 are pivotally mounted at 135 on the carriages 134'. These carriages 134' are reciprocated toward and from the cartons to apply the glue and fold the ends of the tape simultaneously. To effect this movement, the carriage on the left hand side of Fig. XXXII is connected by the link 138 to the lever 140 pivoted at 142 on the standard or bracket 130. The lever 140 is connected by the link 144 to an upwardly projecting arm of the four-armed lever 148. This lever 148 is mounted on the shaft 70 and is provided with a roller 149' traveling on the cam 150 on the shaft 24. The link 144 is provided with a turn buckle 145 for the purpose of adjustment.

The link 144 is connected to the levers 140 and 148 by the pivots 144' and 144" respectively. The link 138 is connected to its carriage 134' and to the lever 140 by the pivots 138' and 140', respectively. The other carriage 134' is connected by the link 139 and the pivots 139' and 141' to the lever 141 which is pivoted at 143 on the standard or bracket 129. The lever 141 is connected by the link 146 to the downwardly projecting arm 148' of the four-armed lever 148. The link 146 is provided with a turn buckle 147 for adjustment and is connected to the arm 148' and to the lever 141 by the pivots 146' and 146" respectively. The lever 148 is acted upon by the spring 151 carried by the arm 152 on the base 1 and connected to the arm 148" of the lever, as appears in Fig. XXXII. The cam 150 acts upon a roller 149 on the pin 149' of the lever 148. By this driving connection, the members 136 are simultaneously operated, as stated, to fold the sealing strips and apply the adhesive thereto. The fingers are dipped into the adhesive on the out-stroke of the carriages, as shown in Fig. XXXIV. They are swung to their folding position, as shown by dotted lines in Fig. XXXIV, on the inward movement of the carriages by the rollers 153 mounted on the journals 153' engaging the stops 155, as shown in the drawing. The rollers passing under the stops hold the members in a horizontal position until they are retracted. When the rollers pass from the stops, the members 136 swing on their pivots to dip their fingers in the tanks, so that as they are withdrawn the adhesive is applied to the strips. Wipers 156 are provided for the fingers 137. These wipers are flexible members arranged in opposed pairs and so that the fingers pass between and the excess of the adhesive is removed. The wipers are carried by the bars 156' mounted on the brackets 157, see Fig. XXXIV. The wipers are preferably arranged so that substantially all of the adhesive is wiped off the inner sides of the fingers.

The folding and sealing of the sealing strips is completed by the rollers 162, there being a roller for each corner of the carton. These rollers fold the corners of the strips down upon the fingers 137. The upper set of rollers are carried by arms 160 on the rock shafts 160' carried by the arm 158 on the bracket 60''. See Figs. I, II, IV, XXXII and XXXIII. The lower set of rollers are mounted on arms 161 on the rock shafts 161' carried by the arm 159 on the standard 129. See Figs. IV, XXXII and XXXIII. The roller journals 162' project laterally from the roller carrying arms. The rock shafts 161' are provided with arms which are connected by the links 164 to the arm 166 on the rock shaft 168. This rock shaft is provided with an arm 170 connected by the link 172 to the oscillating arm 174, which is pivotally mounted at 175. The arm 174 is provided with a roller 177 journaled at 177' to travel on the cam 179 on the shaft 3. The roller is held in engagement with the cam by the spring 181, one end of which is secured at 182. The links 164 and 172 are connected to the arms 166 and 170 respectively, by the pivots 166' and 170'.

The rock shafts 160 for the upper set of rollers are provided with arms connected by the links 163 and the pivots 163' and 165' to the arm 165 on the rock shaft 167. The rock shaft 167 is provided with an arm 169, which is connected by the link 171 to the lever 173 mounted on the shaft 175. The lever 173 is provided with a roller 176 journaled at 176' to travel on the cam 178 on the shaft 3. The lever 173 is held in engagement with the cam 178 by the spring 180. The link 171 is connected to the arm 169 by the pivot 169'. By thus connecting the parts, the rollers are actuated in unison, and are properly timed to fold and press the sealing strips upon the cartons. The cam 179 is shaped so that the loose set of rollers are given a final compressing movement before they are retracted. This takes place after the fingers 137 are withdrawn. This completes the sealing of the sealing strips.

The sealing conveyer discharges the cartons into the chute 186 by which they are delivered to the delivery belt 185. This belt is carried by the pulley 184, journaled at 184' on the bracket 183 at the rear of the machine. By this arrangement of the several mechanisms and their driving connections, the boxes or cartons are automatically fed to and conveyed through the machine, the corner sealing strips are automatically formed from rolls of tape or strips of paper, glued and delivered or fed to the affixing mechanism by which they are affixed to the corners of the carton. The ends of the sealing strips are then tucked and folded and glued and sealed and the completely sealed cartons delivered from the machine by means entirely automatic.

I have illustrated and described the several coacting mechanisms in a practical embodiment. I have not attempted to illustrate or describe various modifications which I contemplate as the disclosure made will enable those skilled in the art to adapt my invention to the end desired.

The structure illustrated is designed for the affixing of corner sealing strips to square boxes or cartons closed by end flaps. It may be readily adapted to other styles of boxes.

Having thus described my invention, what I claim is new and desire to secure by Letters Patent is:

1. The combination with the conveyer actuated with a step by step movement, of sealing strip affixing members; carriages on which said affixing members are yieldingly mounted; ways for said carriages; sealing strip severing knives actuated by said carriages, said affixing members being actuated to affix the sealing strips prior to the severing of the same by the said knives; a vertically reciprocating member; tape holders mounted on said reciprocating member; cutters for forming sealing strips carried by said reciprocating member; sealing strip conformers having angled eyes disposed below said cutters; glue rolls disposed below said sealing strip conformers; angled sealing strip guide eyes below said glue rolls for guiding said sealing strips to said affixing members; means for actuating said affixing member carriages; means for actuating said reciprocating member, the sealing strips being delivered to the affixers by the instroke of said reciprocating member, the outstroke of said member taking place while the sealing strips are clamped by said affixing members and prior to the complete severing of the same whereby the tapes are fed and the glue is applied to the sealing strips; means for actuating said sealing strip cutters after such tape feeding stroke of said reciprocating member; and means for gluing, folding and sealing the ends of said sealing strips.

2. The combination with the conveyer actuated with a step by step movement, of sealing strip affixing members; carriages on which said affixing members are yieldingly mounted; ways for said carriages; sealing strip severing knives actuated by said carriages, said affixing members being actuated to affix the sealing strips prior to the severing of the same by the said knives; a vertically reciprocating member; tape holders mounted on said reciprocating member; cutters for forming sealing strips carried by said reciprocating member; sealing strip conformers having angled eyes disposed below said cutters; glue rolls disposed below said sealing strip conformers; means for actuating said affixing member carriages; means for actuating said reciprocating member, the sealing strips being delivered to the affixers by the instroke of said reciprocating member, the outstroke of said member taking place while the sealing strips are clamped by said affixing members and prior to the complete severing of the same whereby the tapes are fed and the glue is applied to the sealing strips; means for actuating said sealing strip cutters after such tape feeding stroke of said reciprocating member; and means for gluing, folding and sealing the ends of said sealing strips.

3. The combination with the conveyer actuated with a step by step movement, of sealing strip affixing members; carriages on which said affixing members are yieldingly mounted; ways for said carriages; sealing strip severing knives actuated by said carriages, said affixing members being actuated to affix the sealing strips prior to the severing of the same by the said knives; a vertically reciprocating member; tape holders mounted on said reciprocating member; cutters for forming sealing strips carried by said reciprocating member; glue rolls; angled sealing strip guide eyes below said glue rollers for guiding said sealing strips to said affixing members; means for actuating said affixing member carriages; means for actuating said reciprocating member, the sealing strips being delivered to the affixers by the instroke of said reciprocating member, the outstroke of said member taking place while the sealing strips are clamped by said affixing members and prior to the complete severing of the same whereby the tapes are fed and the glue is applied to the sealing strips; means for actuating said sealing strip cutters after such tape feeding stroke of said reciprocating member; and means for gluing, folding and sealing the ends of said sealing strips.

4. The combination with the conveyer actuated with a step by step movement, of sealing strip affixing members; carriages on which said affixing members are yieldingly mounted; ways for said carriages; sealing strip severing knives actuated by said carriages, said affixing members being actuated to affix the sealing strips prior to the severing of the same by the said knives; a vertically reciprocating member; tape holders mounted on said reciprocating member; cutters for forming sealing strips carried by said reciprocating member; glue rolls; means for actuating said affixing member carriages; means for actuating said reciprocating member, the sealing strips being delivered to the affixers by the instroke of said reciprocating member, the outstroke of said member taking place while the sealing strips are clamped by said affixing members and prior to the complete severing of the same whereby the tapes are fed and the glue is applied to the sealing strips; means for actuating said sealing strip cutters after such tape feeding stroke of said reciprocating member; and means for gluing, folding and sealing the ends of said sealing strips.

5. The combination with the conveyer actuated with a step by step movement, of sealing strip affixing members; sealing strip severing knives; said affixing members being actuated to affix the sealing strips prior to the severing of the same by the said knives; a reciprocating member; tape holders mounted on said reciprocating member; glue rolls; means for actuating said affixing members; means for actuating said reciprocating member, the sealing strips being delivered to the affixers by the instroke of said reciprocating member, the outstroke of said member taking place while the sealing strips are clamped by said affixing members and prior to the complete severing of the same whereby the tapes are fed and the glue is applied to the sealing strips; reciprocating members having sealing strip folding and glue applying fingers thereon; sets of sealing rollers mounted for movement in planes substantially at right angles to the planes of movement of the said fingers and adapted to fold the ends of the sealing strips upon said fingers whereby the glue is applied thereto; and means for actuating said rollers adapted to impart a final sealing movement thereto after said fingers have been retracted; and means for gluing, folding and sealing the ends of the sealing strips.

6. The combination with the conveyer actuated with a step by step movement, of sealing strip affixing members; sealing strip severing knives, said affixing members being actuated to affix the sealing strips prior to the severing of the same by the said knives; a reciprocating member; tape holders mounted on said reciprocating member; glue rolls; means for actuating said affixing members; means for actuating said reciprocating member, the sealing strips being delivered to the affixers by the instroke of said reciprocating member, the outstroke of said member taking place while the sealing strips are clamped by said affixing members and prior to the complete severing of the same whereby the tapes are fed and the glue is applied to the sealing strips; and means for gluing, folding and sealing the ends of the sealing strips.

7. The combination with the conveyer actuated with a step by step movement, of sealing strip affixing members; actuating means therefor; a reciprocating sealing strip feeding means; sealing strip severing knives, said affixing members being actuated to affix the sealing strips prior to the severing of the same by the said knives; means for actuating said sealing strip feed means, the sealing strips being delivered to the affixers by the instroke of said feed means, the outstroke of the said feeding means taking place while the sealing strips are clamped by said affixing members and prior to the complete severing of the same; glue applying rolls actuated with said feeding means; reciprocating members having sealing strip folding and glue applying fingers thereon; sets of sealing rollers mounted for movement in planes substantially at right angles to the planes of movement of the said fingers and adapted to fold the ends of the sealing strips upon said fingers whereby the glue is applied thereto; and means for actuating said rollers adapted to impart a final sealing movement thereto after said fingers have been retracted.

8. The combination with the conveyer actuated with a step by step movement, of sealing strip affixing members; actuating means therefor; a reciprocating sealing strip feeding means; sealing strip severing knives, said affixing members being actuated to affix the sealing strips prior to the severing of the same by the said knives; means for actuating said sealing strip feed means, the sealing strips being delivered to the affixers by the instroke of said feed means, the outstroke of the said feeding means taking place while the sealing strips are clamped by said affixing members and prior to the complete severing of the same; glue applying rolls actuated with said feeding means; and means for folding, gluing and sealing the ends of the strips.

9. The combination with the sealing strip feeding means, of radially disposed angled affixing members having supporting stems provided with threaded bolt-like extensions; carriages having sockets for said stems, said stem extensions being arranged through the inner ends of said sockets, their heads serving as stops; springs arranged in said sockets upon said stem extensions to yieldingly support said affixing members; ways for said carriages; knives mounted on said ways above said affixing members and having V-shaped eyes therein through which the sealing strips depend; coacting V-shaped knives mounted on said carriages; and means for simultaneously reciprocating said carriages adapted to impart a final compressing movement thereto, whereby the sealing strips are severed prior to the retracting of the carriages.

10. In a structure of the class described, the combination of radially disposed sealing strip affixing members angled to embrace the corners of a box; carriages on which said affixing members are yieldingly mounted; ways for said carriages; coacting sealing strip severing knives on said carriages and ways, the knives on said ways having angled eyes therein guiding the strips to said affixing members, said affixing members being actuated to affix the sealing strips prior to the severing of the same by the said knives; a vertically reciprocating member; tape rolls mounted on said reciprocating member; cutters for forming sealing strips carried by said reciprocating member; tape guides for said cutters; sealing strip conformers having angled eyes disposed below said cutters; a glue receptacle mounted on said reciprocating member below said cutters; glue rolls having A-shaped peripheries disposed diagonally of said glue receptacle and below said sealing strip conformers; coacting supporting rollers having V-shaped peripheries; angled sealing strip guide eyes below said glue rolls for guiding the sealing strips to the eyes in said knives on said ways; means for actuating said affixing member carriages; means for actuating said reciprocating member, the sealing strips being delivered to the affixers by the downstroke of said reciprocating member, the upstroke of said member taking place while the sealing strips are clamped by said affixing members and prior to the complete severing of the same whereby the tapes are fed and the glue is applied to the sealing strips; and means for actuating said sealing strip cutters after such tape feeding stroke of said reciprocating member.

11. In a structure of the class described, the combination of radially disposed sealing strip affixing members angled to embrace the corners of a box; carriages on which said affixing members are yieldingly mounted; ways for said carriages; coacting sealing strip severing knives on said carriages and ways, said affixing members being actuated to affix the sealing strips prior to the severing of the same by the said knives; a vertically reciprocating member; tape rolls mounted on said reciprocating member, cutters for forming sealing strips carried by said reciprocating member; a glue receptacle mounted on said reciprocating member below said cutters; glue rolls having A-shaped peripheries disposed diagonally of said glue receptacle and below said sealing strip conformers; coacting supporting rollers having V-shaped peripheries; means for actuating said affixing member carriages; means for actuating said reciprocating member, the sealing strips being delivered to the affixers by the downstroke of said reciprocating member, the upstroke of said member taking place while the sealing strips are clamped by said affixing members and prior to the complete severing of the same whereby the tapes are fed and the glue is applied to the sealing strips; and means for actuating said sealing strip cutters after such tape feeding stroke of said reciprocating member.

12. In a structure of the class described, the combination of sealing strip affixing members; carriages on which said affixing members are yieldingly mounted; ways for said carriages; sealing strip severing knives actuated by said carriages, said affixing members being actuated to affix the sealing strips prior to the severing of the same by the said knives; a vertically reciprocating member; tape holders mounted on said reciprocating member; cutters for forming sealing strips carried by said reciprocating member; sealing strip conformers disposed below said cutters; glue rollers disposed below said sealing strip conformers; angled sealing strip guide eyes below said glue rollers for guiding said sealing strips to said affixing members; means for actuating said affixing member carriages; means for actuating said reciprocating member, the sealing strips being delivered to the affixers by the downstroke of said reciprocating member, the upstroke of said member taking place while the sealing strips are clamped by said affixing members and prior to the complete severing of the same whereby the tapes are fed and the glue is applied to the sealing strips; and means for actuating said sealing strip cutters after such tape feeding stroke of said reciprocating member.

13. In a structure of the class described, the combination of sealing strip affixing members; carriages on which said affixing members are yieldingly mounted; ways for said carriages; sealing strip severing knives actuated by said carriages, said affixing members being actuated to affix the sealing strips prior to the severing of the same by the said knives; a vertically reciprocating member; tape holders mounted on said reciprocating member; cutters for forming sealing strips carried by said reciprocating member; sealing strip conformers disposed below said cutters; glue rollers disposed below said sealing strip conformers; means for actuating said affixing member carriages; means for actuating said reciprocating member, the sealing strips being delivered to the affixers by the downstroke of said reciprocating member, the upstroke of said member taking place while the sealing strips are clamped by said affixing members and prior to the complete severing of the same whereby the tapes are fed and the same is applied to the sealing strips; and means for actuating said sealing strip cutters after such tape feeding stroke of said reciprocating member.

14. In a structure of the class described, the combination of sealing strip affixing members; sealing strip severing knives, said affixing members being actuated to affix the sealing strips prior to the severing of the same by the said knives; a reciprocating member; tape holders mounted on said reciprocating member; glue rolls; means for actuating said affixing members; and means for actuating said reciprocating member, the sealing strips being delivered to the affixers by the instroke of said reciprocating member, the outstroke of said member taking place while the sealing strips are clamped by said affixing members and prior to the complete severing of the same whereby the tapes are fed and the glue is applied to the sealing strips.

15. In a structure of the class described, the combination of sealing strip affixing members; actuating means therefor; a reciprocating sealing strip feeding means; sealing strip severing knives, said affixing members being actuated to affix the sealing strips prior to the severing of the same by the said knives; means for actuating said sealing strip feed means, the sealing strips being delivered to the affixers by the instroke of said feed means, the outstroke of the said feeding means taking place while the sealing strips are clamped by said affixing members and prior to the complete severing of the same; and glue applying rolls reciprocated with said feeding means.

16. In a structure of the class described, the combination of sealing strip affixing members; actuating means therefor; a reciprocating sealing strip feeding means; sealing strip severing knives, said affixing members being actuated to affix the sealing strips prior to the severing of the same by the said knives; and means for actuating said sealing strip feed means, the sealing strips being delivered to the affixers by the instroke of said feed means, the outstroke of the said feeding means taking place while the sealing strips are clamped by said affixing members and prior to the complete severing of the same.

17. The combination with the sealing strip feeding means, of affixing members having supporting stems provided with threaded bolt-like extensions; carriages having sockets for said stems, said stem extensions being arranged through the inner ends of said sockets, their heads serving as stops; springs arranged in said sockets upon said stem extensions to yieldingly support said affixing members; ways for said carriages; knives mounted on said ways; coacting knives mounted on said carriages; and means for simultaneously reciprocating said carriages.

18. The combination with the sealing strip feeding means, of affixing members having supporting stems provided with threaded bolt-like extensions; carriages having sockets for said stems, said stem extensions being arranged through the inner ends of said sockets, their heads serving as stops; springs arranged in said sockets upon said stem extensions to yieldingly support said affixing members; ways for said carriages; coacting knives mounted on said carriages; and means for simultaneously reciprocating said carriages.

19. The combination with the sealing strip feeding means, of affixing members therefor; carriages for said affixing members; ways for said carriages; knives mounted on said ways; coacting knives mounted on said carriages; means for actuating said carriages, said affixing members being yieldingly supported and positioned to affix the sealing strips prior to the severing of the same by the said knives.

20. The combination with sealing strip feeding means, of radially disposed angled affixing members; carriages on which said affixing members are yieldingly mounted; and knives on said carriages, said affixing members being adapted to affix the sealing strips prior to the severing of the same by the said knives.

21. In a structure of the class described, the combination with the sealing strip affixing means, of tape roll supports; sealing strips forming cutters; sealing strip conformers having angled eyes disposed below said cutters; glue rolls having A-shaped peripheries disposed radially below said strip conformers; supporting and conforming rolls having V-shaped peripheries coacting with said glue rolls; and angled guide eyes below said rolls for guiding the sealing strips to the said affixing means.

22. In a structure of the class described, the combination of means for affixing sealing strips to the corners of the cartons with the ends of the sealing strips projecting; glue receptacles; carriages mounted to reciprocate above said glue receptacles; members provided with sealing strip folding and gluing fingers pivotally mounted on said carriages to depend into said glue receptacles when the carriages are in their retracted positions; fixed members with which said finger members engage when the carriages are reciprocated whereby the fingers are swung to and retained in operative position on the forward movement of the carriage; wipers adapted to remove the adhesive from the inner sides of the fingers; folding and sealing rollers; rock shafts having arms thereon by which said rollers are carried, disposed so that the rollers swing transversely of said fingers; and means for actuating said finger member carriages and rock shafts timed so that the inner folds of the sealing strips are folded by the fingers and their outer folds are folded upon the fingers to receive the glue therefrom and the rollers are given a final compressing or sealing movement after the fingers are retracted.

23. In a structure of the class described, the combination of means for affixing the sealing strips to the corners of the cartons with the ends of the sealing strips projecting; glue receptacles; carriages mounted to reciprocate above said glue receptacles; members provided with sealing strip folding and gluing fingers pivotally mounted on said carriages to depend into said glue receptacle when the carriages are in their retracted positions; fixed members with which said finger members engage when the carriages are reciprocated whereby the fingers are swung to and retained in operative position on the forward movement of the carriage; folding and sealing rollers; rock shafts having arms thereon by which said rollers are carried, disposed so that the rollers swing transversely of said fingers; and means for actuating said finger member carriages and rock shafts timed so that the inner folds of the sealing strips are folded by the fingers and their outer folds are folded upon the fingers to receive the glue therefrom and the rollers are given a final compressing or sealing movement after the fingers are retracted.

24. In a structure of the class described, the combination of means for affixing the sealing strips to the corners of the cartons with the ends of the sealing strips projecting; glue receptacles; carriages mounted to reciprocate above said glue receptacles; members provided with sealing strip folding and gluing fingers pivotally mounted on said carriages to depend into said glue receptacle when the carriages are in their retracted positions; fixed members with which said finger members engage when the carriages are reciprocated whereby the fingers are swung to and retained in operative position on the forward movement of the carriage; wipers adapted to remove the adhesive from the inner sides of the fingers; and coacting folding and sealing members timed so that the outer folds of the sealing strips are folded upon the fingers to receive the glue therefrom and are pressed upon the inner folds after the fingers are retracted.

25. In a structure of the class described, the combination of means for affixing sealing strips to the corners of the cartons with the ends of the sealing strips projecting; glue receptacles; carriages mounted to reciprocate above said glue receptacles; members provided with sealing strip folding and gluing fingers pivotally mounted on said carriages to depend into said glue receptacle when the carriages are in their retracted positions; fixed members with which said finger members engage when the carriages are reciprocated whereby the fingers are swung to and retained in operative position on the forward movement of the carriage; and coacting folding and sealing members timed so that the outer folds of the sealing strips are folded upon the fingers to receive the glue therefrom and are pressed upon the inner folds after the fingers are retracted.

26. In a structure of the class described, the combination of means for affixing sealing strips to the corners of boxes or cartons with the ends projecting; reciprocating members having sealing strip folding and glue applying fingers thereon; sealing rollers mounted for movement in planes substantially at right angles to the planes of reciprocation of the said fingers and adapted to fold the ends of the sealing strips upon said fingers whereby the glue is applied thereto; and means for actuating the said rollers adapted to impart a fold pressing movement thereto after said fingers have been retracted.

27. In a structure of the class described, the combination of means for affixing sealing strips to the corners of the cartons with the ends of the sealing strips projecting, and means for sealing the ends of the strips; glue receptacles; carriages mounted to reciprocate above said glue receptacles; members provided with sealing strip folding and gluing fingers pivotally mounted on said carriages to depend into said glue receptacle when the carriages are in their retracted positions; fixed members with which said finger members engage when the carriages are reciprocated whereby the fingers are swung to and retained in operative position on the forward movement of the carriage; and wipers adapted to remove the adhesive from the inner sides of the fingers.

28. In a structure of the class described, the combination of means for affixing the sealing strips to the corners of the cartons with the ends of the sealing strips projecting, and means for sealing the ends of the strips; glue receptacles; carriages mounted to reciprocate above said glue receptacles; members provided with sealing strip folding and gluing fingers pivotally mounted on said carriages to depend into said glue receptacle when the carriages are in their retracted positions; fixed members with which said finger members engage when the carriages are reciprocated whereby the fingers are swung to and retained in operative position on the forward movement of the carriage.

In witness whereof, I have hereunto set my hand and seal in the presence of two witnesses.

ORIN A. HANFORD. [L. S.]

Witnesses:
MAURICE G. LYNN,
ROBERT T. GALLAGHER.